United States Patent [19]

Richmond et al.

[11] Patent Number: 5,070,526
[45] Date of Patent: Dec. 3, 1991

[54] SIGNAL ANALYZING SYSTEM

[75] Inventors: Robert L. Richmond; Michael Robinson, both of Seattle, Wash.

[73] Assignee: Active Voice, Inc., Seattle, Wash.

[21] Appl. No.: 564,805

[22] Filed: Aug. 8, 1990

[51] Int. Cl.$^5$ ............................................. H04M 1/64
[52] U.S. Cl. ..................... 379/372; 379/377; 379/386
[58] Field of Search ............... 379/34, 372, 377, 90, 379/91, 92, 386

[56] References Cited

U.S. PATENT DOCUMENTS

| | | | |
|---|---|---|---|
| 4,160,125 | 7/1979 | Bower et al. | 179/6 D |
| 4,201,896 | 5/1980 | Bower et al. | 179/18 B |
| 4,356,348 | 10/1982 | Smith | 179/1 MN |
| 4,405,833 | 9/1983 | Cave et al. | 179/1 MN |
| 4,439,639 | 3/1984 | Munter | 379/386 |
| 4,477,698 | 10/1984 | Szlam et al. | 179/90 BD |
| 4,696,031 | 9/1987 | Freudberg | 379/92 |

Primary Examiner—Stafford D. Schreyer
Attorney, Agent, or Firm—Ward Brown; Robert W. Beach

[57] ABSTRACT

An analog communication signal such as the signal transmitted over a telephone line is converted to digital form for storage in the memory of a computer. Segments of the digital representation of the signal are analyzed to determine whether or not the signal has uniform frequency components repeating at regular intervals. Detection of such regularly repeating uniform frequency components is useful in an automated telephone system to determine whether a telephone signal consists of voice or a call progress signal.

21 Claims, 4 Drawing Sheets

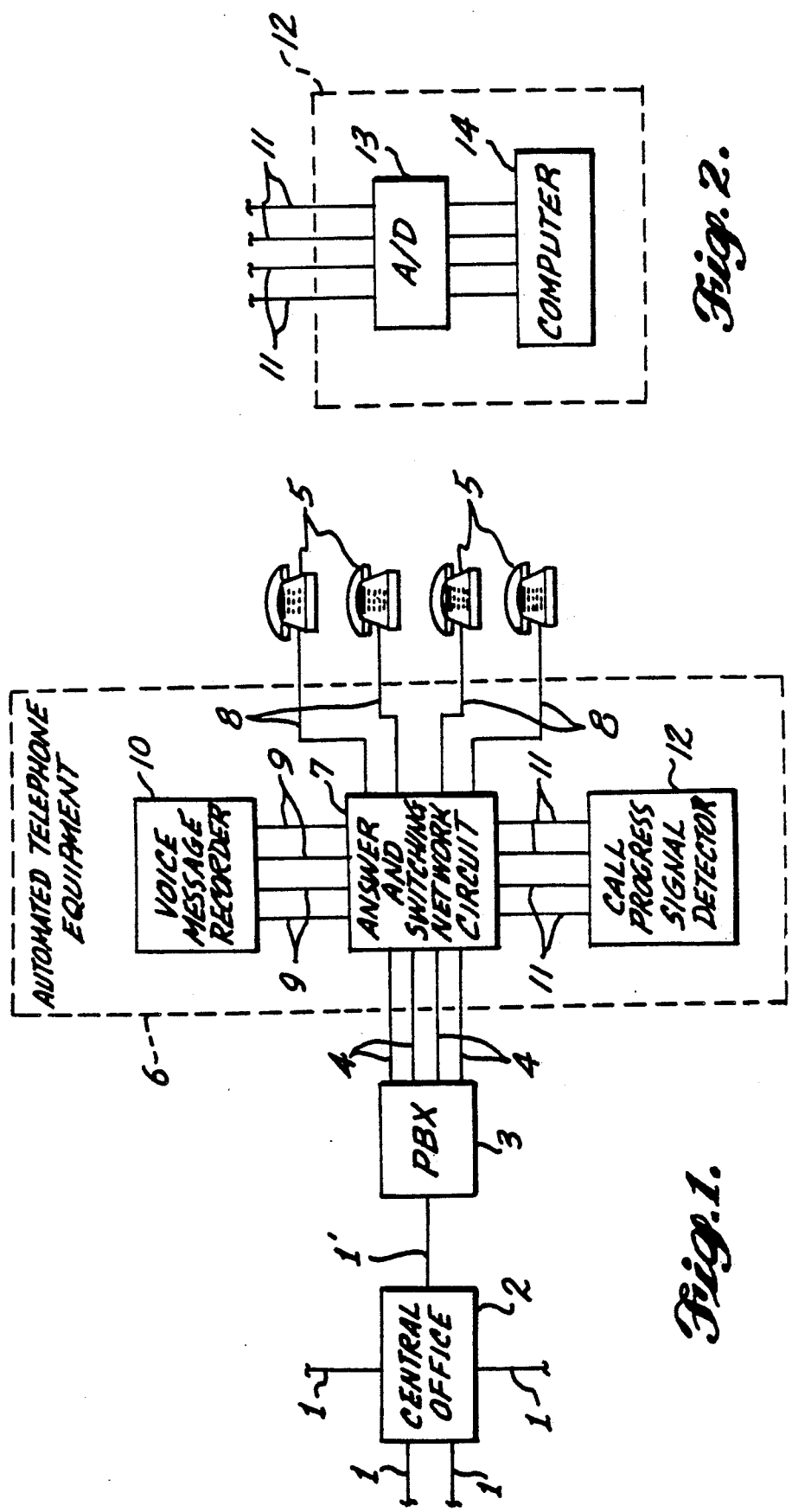

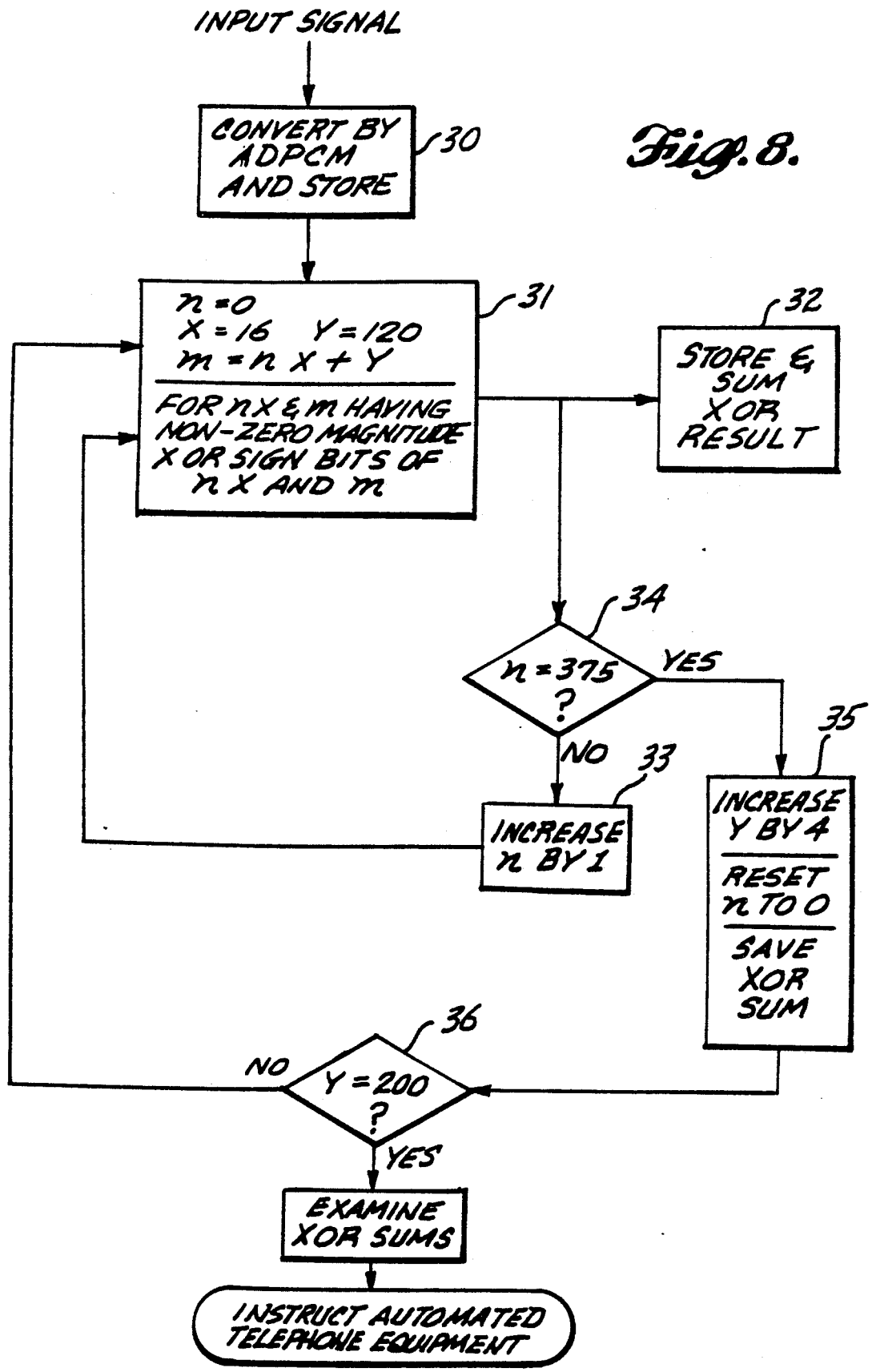

SIGNAL ANALYZING SYSTEM

BACKGROUND OF THE INVENTION

1. Field of the Invention

The present invention relates to a system for analyzing a digital representation of a signal to determine whether the signal is periodic, i.e., has constant or regularly repeating uniform frequency components, or is essentially random with respect to frequency, and particularly to a system for detecting call progress signals in automated telephone equipment, which are periodic, as compared to voice signals which are of essentially random frequency content within the audible frequency band over any time period of substantial length.

2. Prior Art

In various types of automated "voice processing" telephone equipment it is necessary to distinguish between a voice signal and a call progress signal for orderly and convenient operation of the equipment. For example, in automatic dialing equipment of the type intended to provide a recorded message or conduct a survey or poll without human intervention, the equipment should detect a dial tone before dialing and, after dialing, detect a busy signal, congestion signal or ring back signal transmitted from the local telephone service company or a private branch exchange (PBX). The equipment also must detect when the telephone is answered (placed off-hook) and, for most efficient use, should reliably detect signals from a fax machine or modem and detect when the telephone is hung up (returned to its on-hook condition).

On the receiving end, automated attendant systems which take the place of or supplement the traditional human receptionist also may include equipment for automatically recording a message from the caller. The equipment should reliably detect when the caller has hung up, which usually is followed by a call progress signal, namely, a dial tone or reorder signal. Failure to detect the call progress signal can result in recording long segments of it. In addition to being irritating at the time of playback, such a malfunction also can result in consuming large quantities of computer memory for sophisticated systems in which the voice messages are stored in digital form in a computer. On the other hand, falsely characterizing a voice signal as a call progress signal may result in cutting off the caller before the desired message is completed which is frustrating to the caller.

A complicating factor has been the increase in the use of PBX equipment from different manufacturers. Such equipment lacks uniformity in corresponding types of call progress signals. A busy signal or reorder signal of one system can be different from a busy signal or reorder signal of another system both with respect to its frequency components and to duration of and spacing between the loud sounds.

Known prior systems have concentrated on the pattern of the periods of sound and silence to detect the existence of a call progress signal. Bower et al. in their U.S. Pat. No. 4,201,896, issued May 6, 1980, emphasize that Conventional methods of ring and busy detection through use of tone decoders [present] problems due to inconsistencies between local telephone companies with respect to signaling frequencies.

Column 4: lines 40–44. That patent proposes that a voice-activated device (VOX) be used to determine if the "average energy level" is above a preset bias (see the paragraph beginning at column 5, line 39).

To determine that a call has been answered, it is first necessary to determine that at least one ring has appeared on the telephone line. A discrimination that this first ring has appeared on the telephone line is determined by a continuous VOX output of at least 900 milliseconds.

Column 6, lines 43–48. Subsequent rings are determined by

VOX activation of more than 1.2 seconds but less than 50 percent VOX activity for any five second period . . .

Column 7, lines 21–23. Thereafter,

If, after one or more rings, the called party answers the phone by lifting receiver and saying "Hello", a normal response, the VOX will be activated by the "Hello" on the line. This word is normally more than 200 milliseconds but less than 1.2 seconds in duration. Thus, a VOX output for more than 200 milliseconds but for less than 1.2 seconds is considered to be an answer.

Column 6, lines 51–57.

Additionally, in the Bower et al. system silence for more than eight seconds is considered to be an answer (see column 6, lines 58–60). As described toward the top of column 7, a busy signal is considered to be present if there are "8 VOX activations of more than 400 milliseconds but less than 900 milliseconds". Characterization of the received signals is based almost exclusively on the durations of the bursts of detected signal energy.

The system of Smith U.S. Pat. No. 4,356,348, issued Oct. 26, 1982, incorporates VOX circuitry (disclosed in commonly assigned Bower et al. U.S. Pat. No. 4,160,125) which includes . . . comparator means 102 . . . connected to a bias supply V+ so that, in effect, the comparator means 102, as also explained in U.S. Pat. No. 4,160,125 and shown in FIG. 2 thereof, acts as a threshold amplifier in that only inputs from the amplifier means 34 are passed thereby if they exceed the bias level V+ applied to the inverting input thereof.

Column 3, lines 58–64. The Smith system measures the intervals between "zero crossings" as compared to the bias voltage V+. As explained in the paragraph beginning at column 6, line 19, All such inputs which exceed the preset bias or squelch level associated with the comparator means 102 are provided as outputs on the conductor 6 so that, in effect, the comparator 102 only permits signals above a certain level to appear at its output whereupon the zero crossings of an input signal are applied to the input of [an] interrupt request flip-flop means 8 to cause an interrupt request to be generated on [a] conductor 10 thereby. Accordingly, the interrupt request flip-flop means 8 monitors the output of the comparator means 102 and generates an interrupt request output on conductor 10 each time a zero crosspoint is detected on the telephone line being monitored.

The "interrupt request" is fed to a microprocessor.

The microprocessor means 12 is responsive to each interrupt request generated thereby to treat such requests as data corresponding to the timing of zero crosspoints of the input signal on the telephone line to be monitored. While the precise manner in which the microprocessor means 12 processes this information and makes determinations in accordance with the program routine established in the ROM 14 will be described in great detail in conjunction with FIGS. 2–4; it is here sufficient to appreciate that the microprocessor means 12 makes determinations as to whether or not the information being received corresponds to a periodic signal, a non-periodic signal, or a non-existant signal which corresponds to silence. Thereafter, this information is employed to ascertain whether or not (1) a busy signal is present, (2) a recorded message is present, (3) a ring signal is present or (4) an answered telephone is on the line.

Column 6, lines 35-52. In general, the microprocessor determines the "most prevalent interval" between "zero crossings" which is compared with "succeeding time intervals" between "zero crossings" (see the SUMMARY OF THE INVENTION beginning at column 2, line 30) so that signals are characterized based on the timing pattern of bursts of input signals having energy above a preset level.

Cave et al. U.S. Pat. No. 4,405,833, issued Sept. 20, 1983, discloses another system which concentrates on the pattern of silence and sound signals, although Cave et al. measure "envelopes" of dual tone signals within a selected frequency band. The detected pattern is compared to "expected" patterns of call progress signals.

Szlam et al. U.S. Pat. No. 4,477,698, issued Oct. 16, 1984, discloses another type of automated telephone equipment having a call progress signal detection system concentrating on the duration and timing of input signal frequency components within a certain frequency range (100 hertz to 750 hertz). As stated in the paragraph beginning at the top of column 9, after it has been determined that a signal has frequency components within the pass band of a filter, all that the apparatus is concerned with from this point out is the duration of high and low intervals corresponding to the presence and absence of a signal within a pass band.

There can be problems with systems of the type described above because they concentrate only on the duty cycle of a signal—the repetitive pattern of sound and silence—although systems such as those disclosed in the Cave et al. patent and the Szlam et al. patent are somewhat more sophisticated by examining only frequencies within a certain pass band or having a certain relationship. Errors in discrimination between voice and call progress signals have been undesirably frequent. Long loud background noises may be characterized as dial tone such that a calling or called party is cut off by the automated equipment. Some systems have trouble detecting that a called telephone has been answered if the answering occurs before the first ring back signal is generated. Without reliable detection of call progress signals, the usefulness or at least popularity of voice processing systems will be more limited than it otherwise would be.

SUMMARY OF THE INVENTION

The present invention provides a system for determining whether a signal is periodic or essentially random and reliably detects call progress signals as distinguished from voice signals or silence. Rather than concentrating on the duty cycle of call progress signals which can vary from system to system and which can be mimicked by background noise, the present invention recognizes that different frequencies are used for different types of signals and for corresponding types of signals in different systems but, nevertheless, virtually all call progress signals are extremely uniform as to their individual frequency content whereas voice signals are not. Consequently, detection of call progress signals in accordance with the present invention is based on detection of the presence of a signal of uniform frequency content over a substantial period. Since the uniformity of frequency content cannot be mimicked by voice over a substantial period and is never or almost never present in background noise, the system in accordance with the present invention is extremely effective.

With respect to a first embodiment of the invention, it was recognized that all known call progress signals have one or more tones each of which has a frequency which is a multiple of 10 hertz. Therefore, each sound signal is repetitive at intervals of 0.1 second. Stated in another way, a first segment of such a signal of a given length will be identical to another segment of the same length beginning 0.1 second (or a multiple thereof) later. For a signal expressed as a function of time t, $f(t)=f(t+nk)$ for all integers n and $k=0.1$ sec. In accordance with the present invention, such a first segment is compared to such a delayed segment. If a high degree of correspondence is found between the two segments, the signal is classified as periodic and treated as a call progress signal.

More specifically, in the first embodiment of the present invention the analog signal received over the telephone line is converted to digital form and the digital samples are stored in the memory of a computer. For conservancy of computer memory, preferably a "compressed" digital representation is used. Digital samples taken 0.1 second (or a multiple thereof) apart will be identical for call progress tones which are multiples of 10 hertz. The computer is programmed to compare all or part of a series of uniformly spaced samples representing a first segment of the signal with corresponding samples taken a predetermined period of time later which is a multiple of 0.1 second. An algorithm can be used to determine the extent of correspondence between the two samples. In the disclosed embodiment, the values of each pair of corresponding samples being compared are multiplied. The resulting products for all pairs of samples being compared are then added. The sum of such products is compared to the sum of the absolute values of all samples being compared. For a large number of samples, the ratio of the sum of the products to the sum of all sample values will be substantially higher for a call progress signal than for a voice signal.

In a second embodiment of the present invention, an input signal segment of a predetermined duration, such as one second, is converted to digital form and stored in computer memory. Thereafter, a first set of samples representing the signal segment is compared to each of several other sets of samples. Such other sets of samples represent signal segments delayed from the first set by different periods. In the preferred embodiment, for $x=a$ constant integer indicating the spacing between digital samples of the first set (e.g. $x=16$), and for $y=$ an integer indicating the number of samples corresponding to the delay (e.g. $y=120, 124, 128, 132, \ldots, 200$) and for $n=$ an integer from 1 to a desired number of samples to be compared: all samples $nx$ (e.g. the 16th, 32nd, 48th, ... samples) are first compared to all samples $nx+y$, $y=120$ (e.g. the 136th, 152nd, 168th, ... samples), then to samples $nx+y$, $y=124$ (e.g. the 140th, 156th, 172nd, ... samples) and so on. The signal is characterized as periodic if a high degree of correspondence is found between the samples of the first set and the samples of a predetermined number of the other sets.

The analyzation of the signal is ongoing, such that the system promptly detects a switchover in the type of signal from periodic (call progress) to nonperiodic (voice) or vice versa. The system can be used to detect call progress or voice signals at any stage of the processing accomplished by the automated telephone equipment.

BRIEF DESCRIPTION OF THE DRAWINGS

FIG. 1 is a block diagram of a telephone network including automated telephone equipment with a signal analyzing system in accordance with the present invention.

FIG. 2 is a block diagram of the signal analyzing system shown in FIG. 1.

FIG. 8 is a block diagram in the nature of a flow chart illustrating operation of a second embodiment of signal analyzing system in accordance with the present invention.

DETAILED DESCRIPTION

Figure 3:
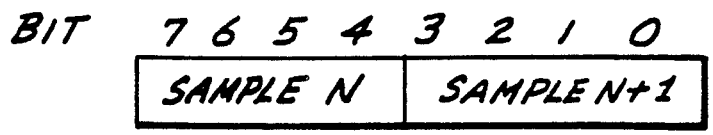
FIGS. 3 and 4 are diagrams illustrating storage of digital samples in the memory of a computer.

The signal analyzing system in accordance with the present invention is used to determine whether or not a signal has constant or regularly repeating uniform frequency components. Such system has particular application in automated telephone equipment for distinguishing between call progress signals and voice signals. In the representative installation illustrated diagrammatically in FIG. 1, several trunks 1 extend from the central office 2 of a local telephone service company. Such trunks include trunk 1' extending to a private branch exchange (PBX) 3. The PBX has several input-output lines 4 for individual telephones 5 or other communication devices requiring access to trunk 1' through the PBX.

Automated telephone equipment 6 is interposed between the PBX 3 and the telephones 5 or other communication devices. Most functions of such equipment are accomplished by programming a single computer. For purposes of simplified explanation, some functions of the automated equipment are represented as separate boxes and use of the invention is described primarily in connection with an automated attendant system of the type which replaces or supplements the traditional receptionist. Such a system includes an answering and switching circuit 7 receiving incoming calls from the PBX. The calls can be routed directly to the appropriate extension telephones 5 through lines 8, or the answer and switching circuit can instruct the caller that the called party is not available and the caller may leave a recorded message if desired. If the caller decides to leave a message, the call is switched to a line 9 leading to a voice message recorder 10. Recorder 10 can include mechanism for converting the analog input signal to digital form to be stored in the memory of a computer for playback at a time convenient to the called party.

As thus far described, the automated attendant equipment is of conventional operation. In accordance with the present invention, however, the answer and switching circuit 7 simultaneously conveys the analog input signal to a novel call progress signal detector 12. Recording of the message from the calling party continues until a call progress signal is detected by component 12, whereupon the message-recording process is terminated promptly and the switching network 7 is triggered to terminate the call.

There are other operations of automated telephone equipment during which reliable detection of a call progress signal is important. For example, some automated telephone equipment currently available has a problem when an automatic dialing PBX goes off-hook at approximately the same time that an incoming call is connected—prior to the first ring of the telephone. The auto dialing component or PBX may attempt to dial the call anyway which may confuse and irritate the party calling in. The call progress signal detector in accordance with the present invention can be used to distinguish silence or an incoming voice signal from dial tone and automatically switch the automated equipment from a dialing mode to an automated answering mode. The party calling out from an extension telephone 5 then can be automatically connected to another line on which dial tone is detected. The novel call progress signal detector in accordance with the present invention also can be used to detect call progress signals at the appropriate time during operation of automatic dialing equipment as compared to automatic attendant equipment.

With reference to FIG. 2, the call progress signal detector 12 receiving the analog telephone signal from a line 11 includes an analog-to-digital converter 13 and a computer 14 in which the digital samples are stored. High quality voice reproduction requires a sampling rate of about 64,000 bits per second (16,000 4-bit samples per second). An advantage of the present invention is that a more compressed representation of the analog telephone signal can be used without jeopardizing efficiency of the system for distinguishing between voice and call progress signals. In the preferred embodiment, the "Adaptive Differential Pulse Code Modulation" (ADPCM) method of data compression can be used. The OKI Semiconductor MSM5218 speech analysis/synthesis integrated circuit available from OKI America Inc. of Horsham, Pa., set for a sampling rate of 6,000 4-bit samples per second is representative of an ADPCM circuit that can be used.

Figure 4:

FIG. 3 and FIG. 4 illustrate how the ADPCM samples are stored in computer memory. As represented in FIG. 3, within each 8-bit byte, one sample is stored as bits 4, 5, 6 and 7, and the next sample is stored as bits 0, 1, 2 and 3. As represented in FIG. 4, within each sample the three lowest numbered bits indicate a magnitude which, in decimal terms, varies from 0 to 7. The highest number bit indicates the sign, 0 for positive and 1 for negative. Consequently, each ADPCM sample varies from −7 to +7 but with magnitude and sign of each sample indicated separately. For a sampling rate of 6,000 samples per second, a sample would be taken approximately every 167 microseconds. Thus, each sample represents the condition existing 167 microseconds after the previous sample was taken.

In development of the system of the present invention, it was considered that call progress signals are generated by highly stable crystal controlled circuits so that the tones making up the sound portions of the signals are very uniform with respect to frequency. Most call progress signals are composed of two different tones generated simultaneously. The following values are representative:

| | |
|---|---|
| dial tone | 350 hertz and 440 hertz; |
| busy signal | 480 hertz and 620 hertz; |
| ring back | 440 hertz and 480 hertz; |
| congestion signal | 480 hertz and 620 hertz; |
| reorder signal | 480 hertz and 620 hertz. |

Figure 5:
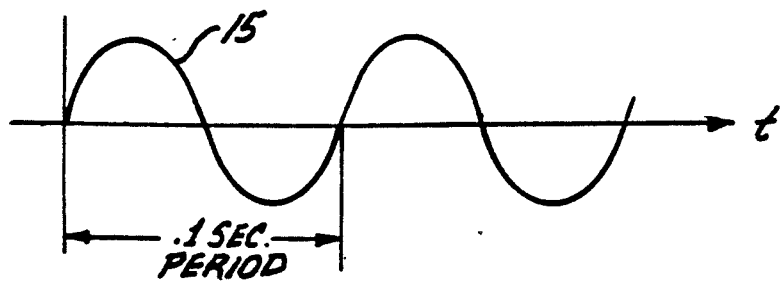
FIG. 5 is a graphical representation of a sinusoidal signal having a frequency of 10 hertz.
Figure 6:
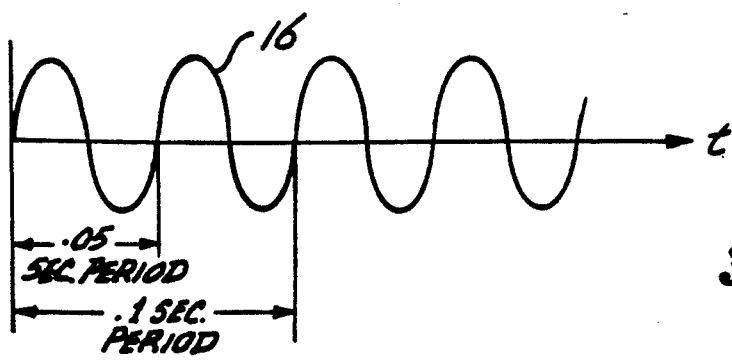
FIG. 6 is a corresponding representation of a sinusoidal signal having a frequency of 20 hertz.

A first embodiment of the present invention is based on a recognition that known call progress signals use tones which are multiples of 10 hertz. As represented in FIG. 5, a 10-hertz signal 15 has a period of 0.1 second. A signal having a frequency which is a multiple of 10 hertz will have a shorter period but still will repeat every 0.1 second. For example, as indicated in FIG. 6, a 20-hertz signal 16 has a period of 0.05 second, but after a delay of 0.1 second will begin its third repetition.

As compared to the call progress signals having uniform frequency components produced by crystal-controlled oscillators voice signals are not highly correlated with respect to frequency except for extremely short periods in the range of about 20 milliseconds to 50 milliseconds which is the approximate length of a phoneme (the smallest unit of speech that distinguishes one utterance from another). Thus, in accordance with the present invention, call progress signals can be detected by analyzing the digital representation of the incoming telephone signal to see whether or not uniform frequency content indicative of a call progress signal is present.

One way in which the present invention is accomplished is by comparing a segment of the signal data with another segment beginning a predetermined period of time later. As noted above, the call progress signals having tones which are multiples of 10 hertz will repeat every 0.1 second. For a sampling rate of 6,000 samples per second, a 0.1 second delay corresponds to 600 samples. If the signal contains only frequency components which are multiples of 10 hertz, the 601st sample will be identical to the first sample, the 602nd sample will be identical to the second sample, and so on.

It has been found that it is not necessary to compare each ADPCM sample with the corresponding sample taken 0.1 second later. In the preferred embodiment, the computer is programmed to compare every 16th sample with its corresponding delayed sample. For reliable distinguishing between voice and call progress signals, the samples should encompass a segment of the signal of substantial length (much longer than a phoneme). Data representing a 1-second segment of the signal with every 16th sample being compared to its delayed counterpart is sufficient for reliable results.

Also, it is preferred that silence not be characterized as a call progress signal. Consequently, samples having a magnitude of 0 are ignored whether in the first set of samples or the delayed set.

Figure 7:
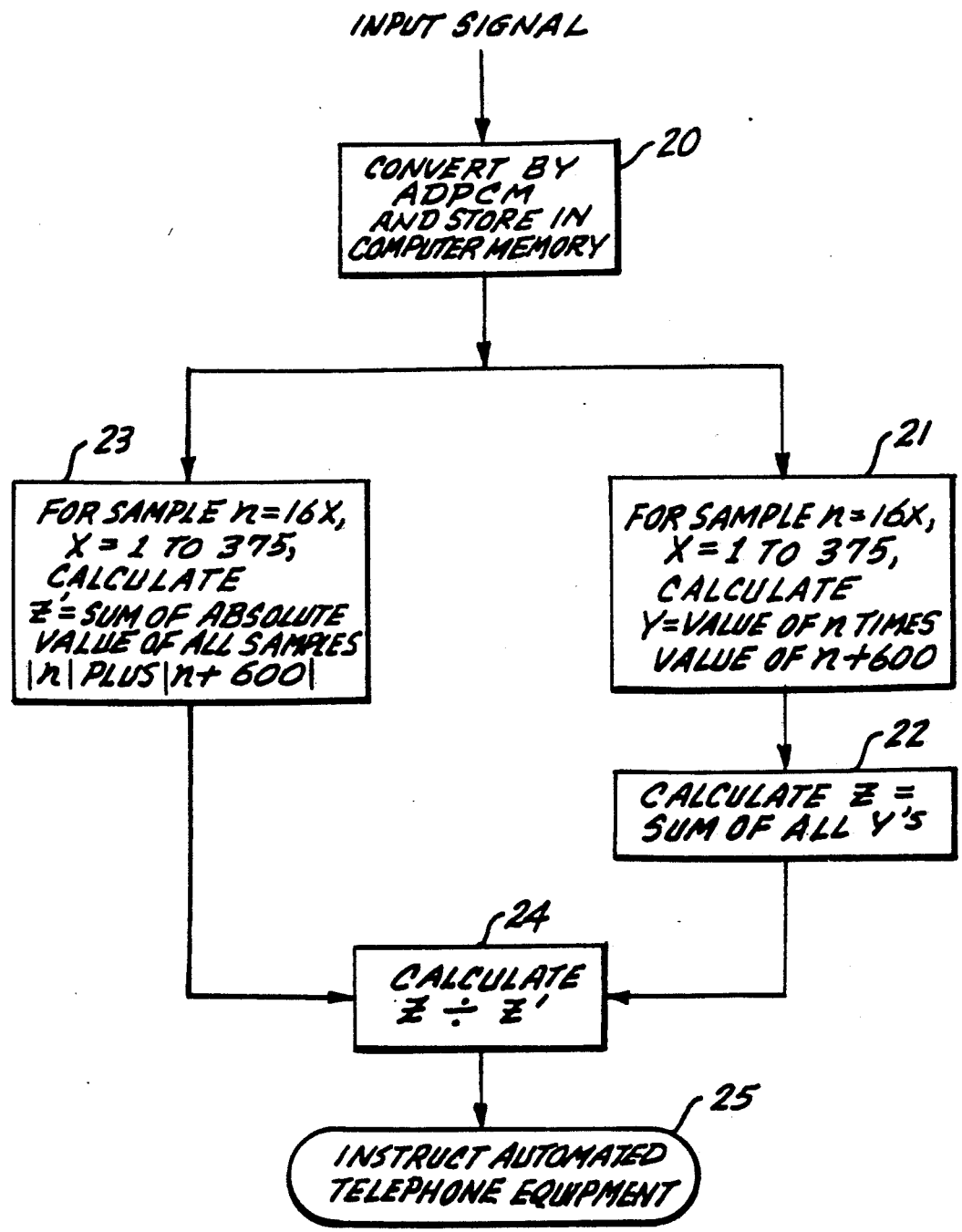
FIG. 7 is a block diagram in the nature of a flow chart illustrating operation of a first embodiment of signal analyzing system in accordance with the present invention.

A computer-executed algorithm can be used to determine the degree of correspondence between the samples of the first set which represent the first 1-second segment of the signal and the samples of the second set which represent a 1-second segment beginning 0.1 second after the beginning of the first segment. Such an algorithm is represented in FIG. 7. The analog input signal from the telephone line is converted by ADPCM to digital format and the digital values are stored in computer memory as represented by box 20. Following the right branch from box 20 to box 21, for a 1-second segment, the value of every 16th sample (375 total samples) is multiplied by the value of the sample taken 0.1 second later (i.e. 600 samples later). Then the sum of all such multiplication products is calculated as represented by box 22. Following the left branch from box 20 to box 23, for the same samples of both sets, the sum of the absolute value of all samples is calculated. Sign bits are ignored. If there is a high degree of correspondence between the samples representing the original signal segment and the samples representing the delayed signal segment, the sum of the products of the compared samples will be substantially greater than the simple sum of the absolute values of the samples. The ratio is calculated as represented by box 24. For the purposes of the present invention, it has been found that the ratio of the product sum to the simple sum will exceed 0.5 if a call progress tone is present, whereas the ratio is less than 0.1 if voice is present. The automatic telephone equipment is controlled accordingly as indicated by box 25.

In a second embodiment of the invention, rather than comparing a first set of samples representing a signal segment of a desired duration to only one additional set representing a delayed signal segment, the samples of the first set are compared to samples of each of several different second sets. Such second sets represent signal segments delayed by different intervals. Such intervals can be selected dependent on the frequency range to be analyzed and can differ by a common amount. Also, a different algorithm is used to determine high or low correspondence between the samples of the first set and samples of another set. The sample magnitudes are ignored and only sign bits are compared.

More specifically, with reference to FIG. 8, the input signal is converted by ADPCM or any other convenient analog to digital process and the samples are stored in computer memory (box 30). As for the previously described embodiment, the first set of samples can be composed of much fewer than all the samples. In a representative embodiment every 16th ADPCM sample can be used for a signal segment of 1 second duration so that there are 375 samples in the first set. Actually there are at most 375 samples because samples having zero magnitude are ignored. As represented by box 31, the sign bit of the first sample (sample number 0) is compared to the sign bit of the sample a predetermined delay later. The first comparison can be conducted with respect to samples a predetermined interval apart which corresponds to a difference of a multiple of the sampling period of 167 microseconds (6,000 samples per second).

For example, the comparison can be between sample number 0 and sample number 120. The exclusive OR value of such sign bits is calculated. A result of 1 is assigned if the signs are different and a result of 0 is assigned if the signs are the same. Such value is stored as represented by box 32. With reference to box 33, the number of the next sample is increased by the desired increment, such as 16, and the process is repeated (boxes 31 and 32 again). For example, the next step would be to compare the sign bit of sample 16 (nx) with the sign bit of sample 136 (nx+y). The exclusive OR result is added to the previous exclusive OR result as represented by box 32.

When the desired number of corresponding sample pairs have been examined, up to 375 in the illustrated embodiment, another path is followed as represented by the line leading from the right of box 34 in FIG. 8. As indicated by box 35, the number of samples ("y") corresponding to the increment of delay is increased by the desired amount, the sample number ("n") is reset to 0 to begin the sampling procedure anew for the new delay and the exclusive OR sum represented by box 32 is saved in memory so that a new sum can be calculated for the different delay. The procedure of comparing samples of the first set (numbers 0, 16, 32, 48, etc.) to samples representing the new delay (in this case 20.7 milliseconds corresponding to 124 sampling periods) is repeated. The exclusive OR sum is stored as represented by box 32, followed by cycling to the next pair of samples to be compared. Sample 0 first is compared with sample 124, then sample 16 is compared with sample 140, and so on. When the desired number of corresponding sample pairs have been examined (up to 375 in the illustrated embodiment), the path to box 35 is followed resulting in increasing delay by the sampling period increment "increase y b 4" as indicated in box 35, resetting the value of n to 0 to begin the comparison process over again and saving the exclusive OR sum for future reference.

The repetitive comparison process is continued a predetermined number of times. In the illustrated embodiment, 20 exclusive OR sums are generated for 20 different delays (y varies from 120 to 200 in four unit increments—see box 36 in FIG. 8).

For each two sets being compared, if there is a great deal of correspondence between samples being compared, the sign bits will be the same and the exclusive OR sum will be small. If the samples being compared are random relative to each other, there is equal probability that the sign bits will be different or the same. Consequently, for signals that are not periodic with respect to the particular delay being tested, the exclusive OR sum should be about 50 percent of the number of sample pairs being compared. If there is a great deal of correspondence, however, the exclusive OR sum will be much lower than 50 percent of the number of sample pairs being compared.

The delay being tested need not be a precise multiple of the period of the signal for a greater than average correspondence to be found. For use in the present invention, it has been found to be a reliable indication of the presence of a call progress signal if there are at least three exclusive OR sums which are less than 35 percent of the total number of samples being compared for the 20 different exclusive OR sums calculated.

After one 1-second segment of data has been examined, the next 1-second segment is examined, so that the input signal is continuously monitored to detect whether or not a uniform frequency call progress signal is on the line. Upon such detection, the automated telephone equipment is controlled accordingly. For example, in automated attendant equipment when a party calling in hangs up following leaving a voice message, a dial tone or recorder signal will be detected, the recording of the voice message will cease and the corresponding telephone line will be returned to its on-hook condition awaiting another call.

In addition to substantially simultaneously monitoring a signal for the presence of constant or repeating uniform frequency components, the present invention also could be used to analyze signals stored previously in computer memory. Sequential segments of memory banks having digital representations of telephone signals would be analyzed in the same manner as described above. Appropriate programming could direct deletion of call progress tones from memory to free up memory space and make playback less time-consuming and irritating.

We claim:

1. Mechanism for analyzing an analog signal represented by digital samples to determine whether the signal has uniform frequency components repeating at a selected period comprising means for selecting a first set of the digital samples representing a first segment of the signal beginning at a predetermined point in time, means for selecting a second set of the digital samples representing a second segment of the signal which second segment begins later than the first segment by an interval equal to the selected period, each sample of the second set corresponding to one sample of the first set taken earlier than such sample of the second set by an interval equal to the selected period, and means for detecting whether there is correspondence between the samples of the first set and the samples of the second set, respectively, indicative of a signal having the uniform frequency components.

2. The mechanism defined in claim 1, in which the detecting means includes means for comparing the values of samples of the second set to the values of samples of the first set.

3. The mechanism defined in claim 1, in which the detecting means includes means for calculating the product obtained by multiplying the value of each sample of the second set by the value of the corresponding sample of the first set.

4. The mechanism defined in claim 3, in which the detecting means includes means for adding all of the products to obtain the product sum.

5. The mechanism defined in claim 4, in which the samples have integral values ranging from a negative integer to a positive integer, the detecting means including means for adding the absolute values of each of the samples of the first set and the samples of the second set to obtain the absolute value sum.

6. The mechanism defined in claim 5, in which the detecting means includes means for comparing the product sum to the absolute value sum.

7. Mechanism for analyzing an analog signal represented by digital samples to determine whether the signal has components of uniform frequency comprising means for selecting a first set of the digital samples representing a first segment of the signal beginning at a predetermined point in time, means for selecting several other second sets of the digital samples each of which second sets represents a segment of the signal beginning later than the first segment by a delay interval different from the delay interval of any of the other second sets, each sample of each of the second sets corresponding to one sample of the first set taken earlier by the delay interval of such second set, and means for characterizing the degree of correspondence between the samples of the first set and the samples of each of the other second sets, respectively, indicative of a signal having uniform frequency components.

8. The mechanism defined in claim 7, in which the digital samples representing the analog signal are spaced by a uniform sampling period, and the number of samples in the first set is much smaller than the total number of digital samples representing the first signal segment.

9. The mechanism defined in claim 8, the digital samples of the first set being spaced uniformly.

10. The mechanism defined in claim 7, the digital samples being multibit samples each having a sign bit, and the characterizing means including means for detecting whether sign bits of corresponding samples are the same.

11. The mechanism defined in claim 10, in which the detecting means includes means for calculating the exclusive OR value of each pair of corresponding samples having a nonzero value.

12. Mechanism for analyzing signals on a telephone line to detect the presence of call progress signals comprising means for converting the signal on the telephone line to digital samples representing the signal, and means for analyzing the digital samples so as to detect presence of a signal of uniform frequency content over a substantial period indicative of a call progress signal.

13. The mechanism defined in claim 12, in which the analyzing means includes means for selecting a first set of the digital samples representing a first segment of the signal beginning at a predetermined point in time, means for selecting a second set of the digital samples representing a second segment of the signal which second segment begins later than the first segment by a preselected delay interval, each sample of the second set corresponding to one sample of the first set taken earlier than such sample of the second set by said preselected delay interval, and means for detecting whether there is correspondence between the samples of the first set and the samples of the second set, respectively, indicative of a call progress signal.

14. The mechanism defined in claim 13, in which the delay interval is about 0.1 second.

15. The mechanism defined in claim 13, in which the analyzing means includes means for selecting several other second sets of the digital samples each representing a segment of the signal beginning later than the first segment by a delay interval different from the delay interval of any of the other second sets, each sample of each of the second sets corresponding to one sample of the first set taken earlier by the delay interval of such second set, and means for characterizing the degree of correspondence between the samples of the first set and the samples of each of the other second sets, respectively, indicative of a call progress signal.

16. The mechanism defined in claim 15, in which the digital samples have sign bits, the characterizing means including means for comparing the sign bits of corresponding samples.

17. The method of determining whether an analog signal has uniform frequency components which comprises converting the analog signal to digital form, selecting a first set of digital samples representing a first segment of the signal beginning at a predetermined point in time, selecting a second set of digital samples representing a second segment of the signal which segment begins later than the first segment by a preselected delay interval, and detecting whether there is correspondence between the samples of the first set and the samples of the second set, respectively, indicative of a signal having uniform frequency components.

18. The method of detecting whether an analog signal has components of uniform frequency which comprises converting the analog signal to digital form, selecting a first set of digital samples representing a first segment of the signal beginning at a predetermined point in time, selecting several other second sets of digital samples each of which second sets represents a segment of the analog signal beginning later than the first segment by a delay interval different from the delay interval of any of the other second sets, and comparing the samples of the first set and the samples of each of the other second sets, respectively, to detect correspondence indicative of a signal having uniform frequency components.

19. The method of analyzing signals on a telephone line to detect the presence of call progress signals which comprises converting the signal on the telephone line to digital samples representing the signal, storing the digital samples in the memory of a computer, selecting a first set of the digital samples representing a first segment of the signal beginning at a predetermined point in time, selecting a second set of the digital samples representing a segment of the signal beginning later than the first segment, and comparing the two sets of samples to detect whether or not the signal has uniform frequency content over a substantial period of time.

20. The method of detecting the presence of call progress signals on a telephone line which comprises converting the signal to digital samples representing the signal, and analyzing the samples so as to detect presence of a signal of uniform frequency content over a substantial period indicative of a call progress signal.

21. The method of eliminating digital call progress signals from a computer memory bank containing digital voice signals which comprises examining the computer memory bank to detect signal segments having uniform frequency content, and deleting such signal segments from the computer memory bank.

* * * * *